(12) United States Patent
Jensen

(10) Patent No.: US 11,441,546 B2
(45) Date of Patent: Sep. 13, 2022

(54) NACELLE COVER FOR IMPROVING LIGHTNING PROTECTION

(71) Applicant: Siemens Gamesa Renewable Energy A/S, Brande (DK)

(72) Inventor: Henrik Abild Jensen, Viborg (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 81 days.

(21) Appl. No.: 16/821,360

(22) Filed: Mar. 17, 2020

(65) Prior Publication Data

US 2020/0300229 A1 Sep. 24, 2020

(30) Foreign Application Priority Data

Mar. 22, 2019 (EP) .................................... 19164670

(51) Int. Cl.
*F03D 80/30* (2016.01)

(52) U.S. Cl.
CPC .................................... *F03D 80/30* (2016.05)

(58) Field of Classification Search
CPC ................ F03D 80/30; B64D 45/02
See application file for complete search history.

(56) References Cited

U.S. PATENT DOCUMENTS

| | | | | |
|---|---|---|---|---|
| 6,932,574 B2* | 8/2005 | Wobben | ................. | H02G 13/80 361/216 |
| 7,837,443 B2* | 11/2010 | Mikkelsen | .............. | F03D 80/30 416/146 R |
| 9,022,745 B2* | 5/2015 | Shimono | ................. | F03D 80/30 416/244 R |
| 9,097,238 B2* | 8/2015 | Lewke | .................... | F03D 80/30 |
| 9,157,419 B2* | 10/2015 | Lewke | .................... | F03D 80/30 |
| 9,169,826 B2* | 10/2015 | Muto | ..................... | H02G 13/80 |
| 9,334,852 B2* | 5/2016 | Olsen | ...................... | F03D 80/30 |
| 9,422,924 B2* | 8/2016 | Thiel | ...................... | F03D 80/30 |
| 9,644,614 B2* | 5/2017 | Olsen | ..................... | F03D 80/30 |
| 2011/0305573 A1* | 12/2011 | Olsen | ..................... | F03D 80/30 416/146 R |

(Continued)

FOREIGN PATENT DOCUMENTS

| | | |
|---|---|---|
| CN | 101463802 A | 6/2009 |
| WO | 2008006377 A1 | 1/2008 |
| WO | 2011057828 A1 | 5/2011 |

OTHER PUBLICATIONS

European Search Report dated Sep. 27, 2019 for Application No. 19164670.2.

*Primary Examiner* — Woody A Lee, Jr.
*Assistant Examiner* — Wesley Le Fisher
(74) *Attorney, Agent, or Firm* — Schmeiser, Olsen & Watts LLP

(57) ABSTRACT

Provided is a wind turbine including: a hub, at least one blade fixed to the hub, a nacelle on which the hub is rotatably mounted for rotating about a rotational axis, a tower on which the nacelle is mounted, a plurality of hitting areas which are subject to be hit by a lightning stroke. The nacelle includes an outer cover having a first plurality of portions including a conductive material and a second plurality of portions including a non-conductive material, the first plurality of portions being arranged along at least a path between the plurality of hitting areas and the tower.

3 Claims, 2 Drawing Sheets

(56) References Cited

U.S. PATENT DOCUMENTS

Figure 1:
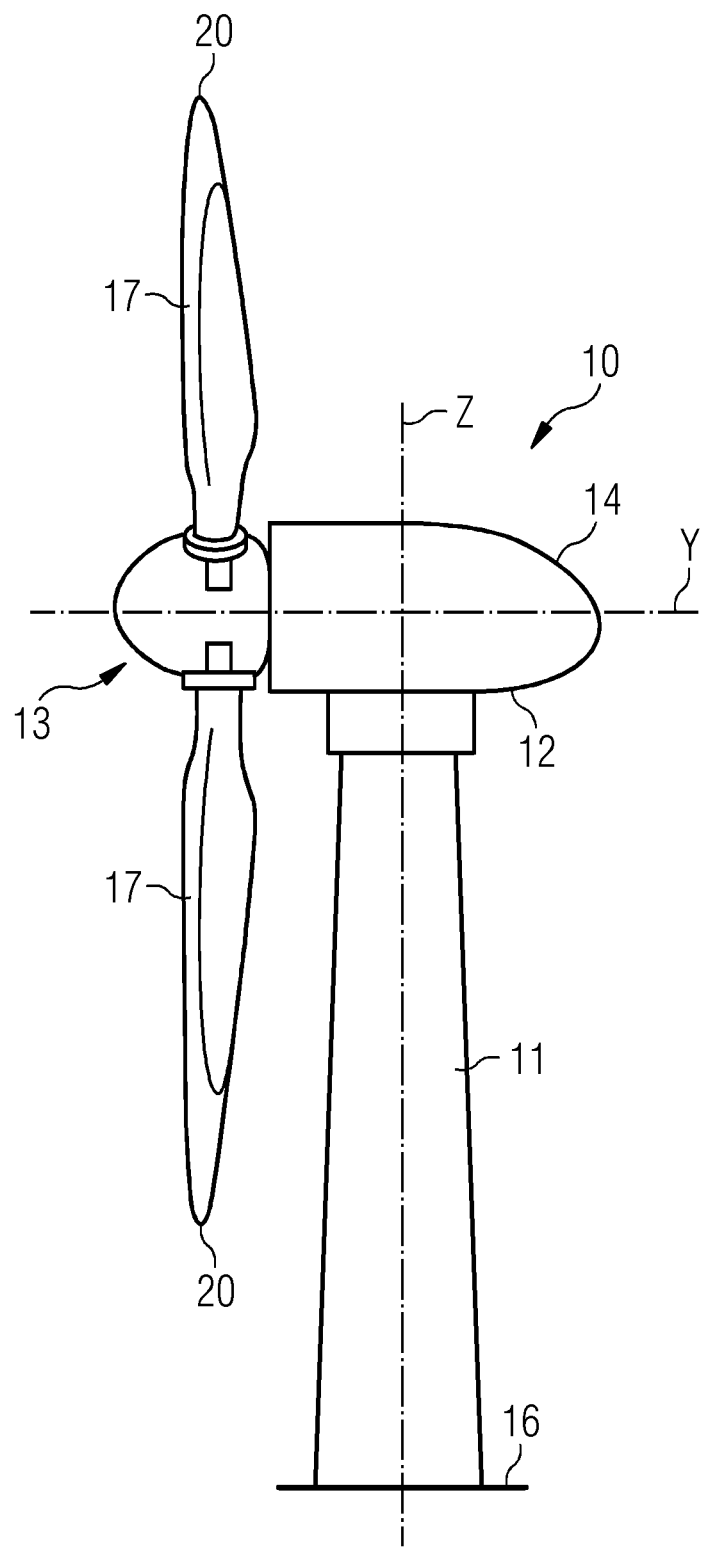

2012/0301300 A1\* 11/2012 Muto ................... H02G 13/00
 416/146 R
2013/0115073 A1\* 5/2013 Thiel ...................... F03D 13/20
 415/208.1

\* cited by examiner

NACELLE COVER FOR IMPROVING LIGHTNING PROTECTION

CROSS-REFERENCE TO RELATED APPLICATIONS

This application claims priority to EP Application No. 19164670.2, having a filing date of Mar. 22, 2019, the entire contents of which are hereby incorporated by reference.

FIELD OF TECHNOLOGY

The following relates to a nacelle of a wind turbine having a cover for providing an efficient lightning protection.

BACKGROUND

In a wind turbine a lightning protection arrangement has to be provided for guiding a lightning stroke from the impact point down to ground. Blades are the most typical wind turbines component, which are subject to being hit by a lightning stroke. Typically, a lightning protection arrangement has therefore to guide a lightning stroke from the blades, through the hub structure and the wind turbine main shaft to the nacelle cover and the tower down to earth. The current flowing from the impact #point to the ground tends naturally to move towards the external cover of the nacelle, according to the known skin effect.

SUMMARY

An aspect relates to that of providing, in a nacelle for a wind turbine, an optimized current path for a lightning stroke towards the ground by optimizing the conductivity of the nacelle cover.

According to embodiments of the invention there is provided a wind turbine including:
a hub,
at least one blade fixed to the hub,
a nacelle on which the hub is rotatably mounted for rotating about a rotational axis,
a tower on which the nacelle is mounted,
a plurality of hitting areas which are subject to be hit by a lightning stroke, wherein the nacelle comprises an outer cover having a first plurality of portions comprising a conductive material and a second plurality of portions comprising a non-conductive material, the first plurality of portions being arranged along at least a path between the plurality of hitting areas and the tower.

Hitting areas may be located on the blades or on a rear section of the nacelle opposite to the hub.

Once an optimal current path for a lightning stroke is defined from the expected hitting areas and the ground, the first plurality of portions comprising a conductive material and the second plurality of portions comprising a non-conductive material can be arranged relatively to each other to guide the lightning stroke along said path.

With respect to nacelle covers completely made of a conductive material or completely made of a non-conductive material the nacelle cover of embodiments of the present invention provides a plurality of advantages, among which:
enhancing the natural behavior of a lightning path towards the external surface of the nacelle (skin effect),
improving the level of lightning protection according to the standard IEC 61400-24, which can reduce the requirements to electrical parts inside the nacelle with consequent cost savings,
increasing the protection level of operators eventually present inside the nacelle,
decreasing the electromagnetic compatibility emissions to the surroundings,
reducing the amount of expensive and heavy conductive portions, in particular made of steel, thereby also reducing costs and weight of the nacelle,
reducing the maintenance time required to perform service on parts in the improved lightning path.

In embodiments of the present invention, a portion of the outer cover comprising a conductive material may be provided in a front section of the nacelle adjacent to the hub. Such portion may provide a good electrical connection with the tower of the wind turbine for guiding a lightning strike down to the ground. Alternatively, or additionally, a portion of the outer cover comprising a conductive material may be provided in a rear section of the nacelle opposite to the hub. Advantageously this arrangement provides an optimized path for a lightning strike hitting the rear section of the nacelle. A portion of the outer cover comprising a conductive material may be provided in a middle section of the nacelle for connecting the front section and the rear section of the nacelle. This arrangement may provide an optimized path for a lightning strike hitting the rear section of the nacelle towards the front section and the tower.

In embodiments of the present invention, the first plurality of portions may comprise steel or other conductive metal. The second plurality of portions may comprise glass fiber or an aluminum non-conductive alloy or other non-conductive metal. Material may be in particular chosen, which also an effective protection in case of fire.

The aspects defined above and further aspects of embodiments of the present invention are apparent from the examples of embodiment to be described hereinafter and are explained with reference to such examples of embodiment. Embodiments of the invention will be described in more detail hereinafter with reference to examples of embodiment but to which embodiments of the invention are not limited.

BRIEF DESCRIPTION

Figure 2:
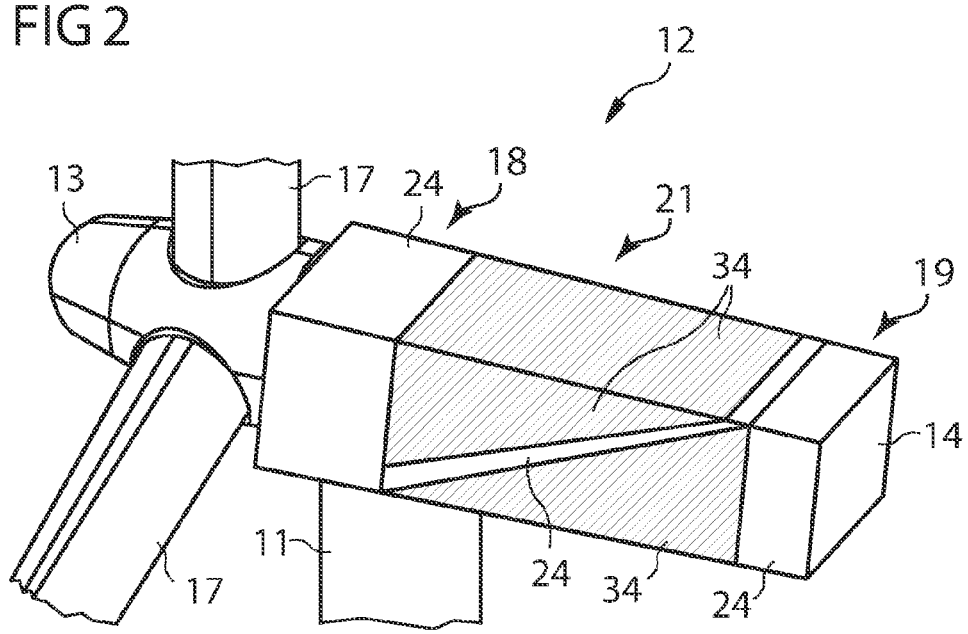

Some of the embodiments will be described in detail, with reference to the following figures, wherein like designations denote like members, wherein:

FIG. 1 shows a schematic lateral view of a wind turbine including a lightning protection according to embodiments of the present invention; and FIG. 2 shows a partial schematic axonometric view of embodiments of the turbine of FIG. 1.

DETAILED DESCRIPTION

The drawings are in schematic form. Similar or identical elements are referenced by the same or different reference signs.

FIG. 1 shows a conventional wind turbine 10 for generating electricity. The wind turbine 10 comprises a tower 11 which is mounted on the ground 16 at one bottom end. At the opposite top end of the tower 11 there is mounted a nacelle 12. The nacelle 12 is usually mounted rotatable with regard to the tower 11, which is referred to as comprising a yaw axis Z substantially perpendicular to the ground 16. The nacelle 12 comprises a nacelle outer cover 14 and usually accommodates the generator of the wind turbine and the gear box (if the wind turbine is a geared wind turbine). The gear box is not present if the wind turbine is direct drive wind turbine. Embodiments of the present invention may in general be applied to both types of wind turbines: geared wind turbines and direct drive wind turbines.

The wind turbine 10 comprises a hub 13 which is rotatably attached to the nacelle 12 for rotating about a rotor axis Y, which is a longitudinal axis Y of the nacelle 12. When not differently specified, the terms axial, radial and circumferential in the following are made with reference to the longitudinal rotor axis Y. The hub 13 is often described as being a part of a wind turbine rotor, wherein the wind turbine rotor is capable to rotate about the rotor axis Y and to transfer the rotational energy to an electrical generator (not shown).

The wind turbine 1 further comprises at least one blade 17 (in the embodiment of FIG. 1, the wind rotor comprises three blades 17, of which only two blades 17 are visible) mounted on the hub 13. The blades 17 extend substantially radially with respect to the rotational axis Y.

The wind turbine 1 comprises a plurality of hitting areas 20 a lightning strike may be subject to hit the wind turbine. The plurality of hitting areas 20 includes the external surfaces of the blades 17 of the wind turbine 10, in particular the radial ends (tips) of the blades 17. Other hitting areas are located a rear section of the nacelle opposite to the hub. Other hitting areas may be foreseen depending on the type and on the dimensions of the wind turbine.

FIG. 2 shows details of an embodiment of the outer cover 14 of the nacelle 12. The outer cover 14 comprises a first plurality of portions 24 comprising a conductive material. In particular the first plurality of portions 24 may be constituted of a conductive material. The conductive material may be steel or any other conductive metal. The outer cover 14 comprises a second plurality of portions 34 comprising a non-conductive material. In particular the second plurality of portions 34 may be constituted of a non-conductive material. The non-conductive material may be fiber glass, a non-conductive aluminum alloy or another non-conductive material. The first plurality of portions 24 are arranged along at least a current path between any of the hitting areas 20 and the tower 11. Once one or more current paths are defined, which connects the hitting areas 20 towards the tower 11 and the ground 16, the first plurality of conductive portions 24 may be arranged to define such path(s). The current path(s) may be optimized, also considering the skin effect which occurs when a lightning stroke hit the wind turbine. The plurality of non-conductive portions 34 are arranged between the plurality of conductive portions 24 for isolating the portions of the nacelle outer cover 14 not included in the path between the hitting areas 20 and the tower 11.

With reference to the embodiment shown in FIG. 2, the outer cover 14 comprises a front section 18 adjacent to the hub 13, a rear section 19 longitudinally opposite to the hub 13 and a middle section 21 interposed between the front section 18 and the rear section 19. The front section 18 comprises a conductive material. The front section 18 may provide a conductive path between the hub 13 and tower 11 for guiding a lightning stroke from the blade to the tower 11 and the ground 16. The rear section 19 comprises also a conductive material. The conductive material in the rear section 19 may provide a protection for a transformer attached to the electric generator of the wind turbine. The conductive material in the rear section 19 may be different from the conductive material in the front section 18. The middle section 21 includes conductive portions 24 for connecting the conductive front section 18 and rear section 19. The conductive material in middle section 21 may be different from the conductive material in the front section 18 and/or in the rear section 19. The middle section 21 further includes non-conductive portions 34 extending between the conductive portions 24. The conductive portions 24 define the current path connecting the rear section 19 and the front section 18. The rear section 19 and the conductive portions 24 of the middle section 21 may provide a current path between the rear section of the nacelle 12 opposite to the hub 13 and the front section 18. From the front section 18 the current path may continue to the tower 11 for guiding a lightning stroke from the rear section of the nacelle 12 to the tower 11 and the ground 16. The According to other embodiment of the present invention (not shown), the first plurality of portions 24 and the second plurality of portions 34 may have other arrangements depending on the predefined or desired path between the hitting areas and the tower of the wind turbine. Any embodiment may differentiate itself from the other embodiments for the number, position shape and dimensions of the first plurality of portions 24 and/or the second plurality of portions 34.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine including:
   a hub,
   at least one blade fixed to the hub,
   a nacelle on which the hub is rotatably mounted for rotating about a rotational axis,
   a tower on which the nacelle is mounted,
   a plurality of hitting areas which are subject to be hit by a lightning strike, wherein at least a first portion of the plurality of hitting areas is located on the at least one blade of the wind turbine and at least a second portion of the plurality of hitting areas is located on a rear nacelle section opposite to the hub,
   wherein the nacelle comprises an outer cover having a front section adjacent to the hub, a rear section longitudinally opposite to the hub, and a middle section interposed between the front section and the rear section,
   wherein the front section comprises a first conductive material and provides a conductive path between the hub and the tower for guiding the lightning strike from the at least one blade to the tower, the rear section comprises a second conductive material, and the middle section includes conductive portions and at least one non-conductive portion,
   wherein the conductive portions define a current path connecting the front section and the rear section, and the at least one non-conductive portion extends between respective conductive portions.

2. The wind turbine according to claim 1, wherein at least one conductive portion of the conductive portions comprises steel.

3. The wind turbine according to claim 1, wherein the at least one non-conductive portion comprises glass fiber.

* * * * *